United States Patent
Bloch et al.

[11] Patent Number: 5,804,024
[45] Date of Patent: Sep. 8, 1998

[54] PAPER-FILM LAMINATE SEALING TAPE

[76] Inventors: Gilbert Bloch, 3349 S. Malo Ct., Palm Beach Gardens, Fla. 33410; Gerald Bloch, 21 E. 87th St., New York, N.Y. 10028; Arnold B. Finestone, 2400 Presidential Way, West Palm Beach, Fla. 33401

[21] Appl. No.: 693,482

[22] Filed: Aug. 8, 1996

Related U.S. Application Data

[63] Continuation-in-part of Ser. No. 232,648, Apr. 25, 1994, abandoned, which is a continuation-in-part of Ser. No. 169,007, Dec. 20, 1993, abandoned.

[51] Int. Cl.$^6$ ...................................................... B32B 7/12
[52] U.S. Cl. .................................. 156/272.6; 156/275.7; 156/324; 156/332
[58] Field of Search .................................. 428/343, 345, 428/350, 355 AC, 507, 511, 351; 156/272.6, 275.7, 276, 324, 332–335

[56] References Cited

U.S. PATENT DOCUMENTS

| | | | |
|---|---|---|---|
| 2,771,385 | 11/1956 | Humphner | 428/350 |
| 3,034,944 | 5/1962 | Chipman | 428/350 |
| 3,560,247 | 2/1971 | Robinson | 428/350 |
| 3,592,682 | 7/1971 | Weiner et al. | 428/350 |
| 4,041,202 | 8/1977 | Williams . | |
| 4,096,013 | 6/1978 | Lutzmann et al. . | |
| 4,351,877 | 9/1982 | Williams . | |
| 4,524,097 | 6/1985 | Graham | 428/350 |
| 4,557,971 | 12/1985 | Williams . | |
| 4,801,487 | 1/1989 | Kalus et al. . | |
| 4,833,002 | 5/1989 | Sinclair | 428/355 AC |
| 4,895,747 | 1/1990 | Birkholz et al. . | |
| 5,190,798 | 3/1993 | Bloch . | |
| 5,244,702 | 9/1993 | Finestone et al. | 428/511 |
| 5,318,841 | 6/1994 | Gardiner et al. | 428/350 |
| 5,492,765 | 2/1996 | Vratsanos et al. | 428/511 |
| 5,565,252 | 10/1996 | Finestone et al. | 428/40.9 |

FOREIGN PATENT DOCUMENTS

| | | | |
|---|---|---|---|
| 1172753 | 12/1969 | United Kingdom | 428/350 |
| 1569447 | 5/1977 | United Kingdom . | |

*Primary Examiner*—Michael W. Ball
*Assistant Examiner*—Michael A. Tolin
*Attorney, Agent, or Firm*—Pennie & Edmonds LLP

[57] ABSTRACT

A paper-film laminate sealing tape for sealing a corrugated board carton or other article fabricated of recyclable material. The tape is composed of a base ply formed of oriented synthetic plastic film whose opposing surfaces are corona-discharge treated to render them wettable and receptive to adhesives, and a paper face ply cold laminated to the base ply by a water-based adhesive. The exposed surface of the film base ply is coated with a water-remoistenable adhesive, such as a starch, so that when this adhesive is moistened in a tape dispenser, the sealing tape can then be adhered to the carton. Since the re-moistenable adhesive is coated on the film ply which is water-impermeable, when this adhesive is moistened with water it remains in a moistened state in a condition to be applied to the carton for a controlled "open-time" period. Because of the strong bond between the film base ply and the paper face ply which resists delamination, the laminate tape adhered to the carton may be stripped therefrom, so that the carton can then be recycled or reused.

13 Claims, 1 Drawing Sheet

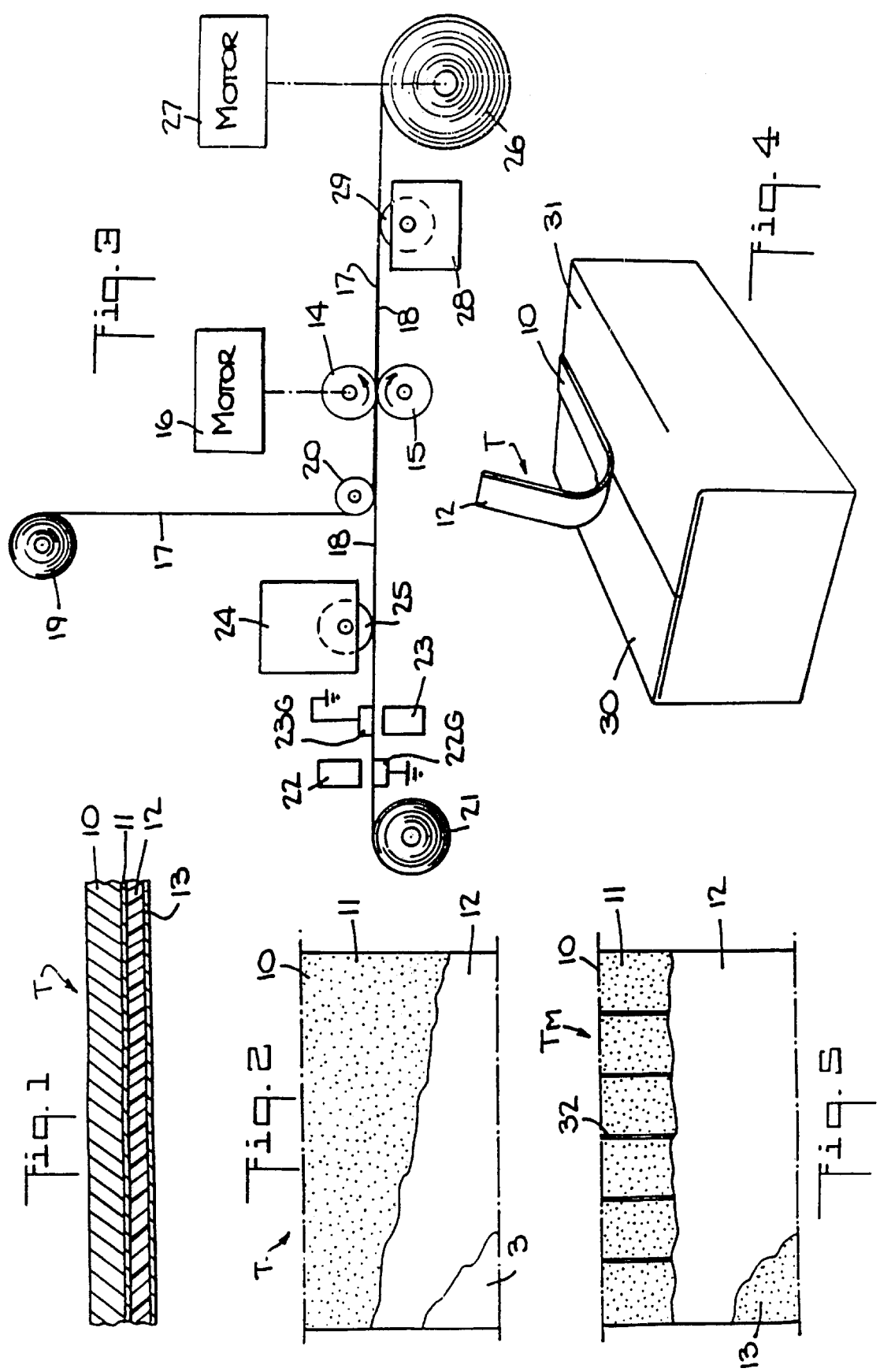

PAPER-FILM LAMINATE SEALING TAPE

Related Applications:

This application is a continuation-in-part of the application of Gilbert Bloch, Gerald Bloch and Arnold B. Finestone Ser. No. 08/232,648, filed Apr. 25, 1994, entitled "PAPER-FILM LAMINATE SEALING TAPE" which in turn is a continuation-in-part of application Ser. No. 08/169,007, filed Dec. 20, 1993, having the same title, now abandoned. The entire disclosures of these applications are incorporated herein by reference.

BACKGROUND OF INVENTION

1. Field of Invention

This invention relates generally to adhesive tapes for sealing cartons and other articles formed of recyclable material, and more particularly to a paper-plastic film laminate sealing tape whose film ply is coated with a water-remoistenable adhesive, the "open-time" of the tape during which the adhesive remains in a moistened condition after it has been moistened, being of a controlled duration.

2. Status of Prior Art

Because of rising environmental concerns, in recent years stress has been placed on the use of products fabricated of materials which can be recycled. Thus a strong preference now exists for bags, cartons and other articles made of paper, for these can be recycled. This is not true of most products made entirely or in part of synthetic plastic materials.

Thus a corrugated board carton lends itself to recycling, but not if the carton is sealed by a standard fiberglass-reinforced paper tape. This tape has its inner and outer paper plies laminated together with glass fibers therebetween by a hot melt polymeric adhesive, the nature of which is such that it is not compatible with recycling operations in which the carton is shredded in a beater and a slurry is then formed of the shredded material for further processing.

In the 1982 Williams, U.S. Pat. No. 4,351,877, there is disclosed a multiple layer laminated tape having an upper strength layer made of a pre-stretched polypropylene film laminated to a weak lower carrier layer of thin, low internal bond Kraft paper. The paper carrier layer has a coating thereon of a water-soluble adhesive which is used to apply the tape to separable portions of a cardboard carton. The carrier layer serves as a medium to "carry" the water soluble adhesive and also to provide sufficient longitudinal rigidity to permit dispensing of the tape from a standard Kraft paper type tape dispensing machine. Williams points out that the plastic film layer "cannot hold a water-soluble adhesive" which is why the paper carrier layer is necessary. The act of stripping the tape from a carton pulls away the upper plastic layer and splits the Kraft carrier layer that has low internal bond, leaving only a layer of Kraft paper on the carton. This paper layer is so thin, it can very easily be ruptured to permit opening of the carton.

The 1985 Williams, U.S. Pat. No. 4,557,971, discloses a sealing tape in which a paper face layer providing a surface suitable for printing or marking is laminated to an intermediate polypropylene film layer to which is adhered a carrier layer of low bond Kraft paper. The exposed surface of the paper carrier layer is coated with a water-soluble adhesive which is used to adhere the tape to a carton. The reason the adhesive is applied to the paper carrier layer and not to the plastic film layer is that the carrier layer "serves as a medium to 'carry' the water soluble adhesive that otherwise could not be applied onto the plastic layer."

Because the intermediate film layer is stronger than the carrier layer, when one wishes to strip the sealing tape from the carton so that the flaps of the carton can be opened, the film layer is stripped off, leaving the carrier layer adhered to the flaps of the carton. Since the carrier layer is of weak paper, it can readily be split open to release the flaps.

The sealing tape disclosed in the Williams patent requires three separate operations to produce; the first being a laminating step in which the paper face layer is laminated to an intermediate polypropylene film layer to produce a paper-film laminate. In the second step, the paper-film laminate is laminated to a carrier layer and in the third step, the carrier layer is coated with a water-soluble adhesive. These three process steps increase the cost of producing the sealing tape.

When a user cuts a strip of pressure-sensitive adhesive tape from a roll dispenser, this strip remains in a useable condition for an indefinite period, for however long the pressure-sensitive adhesive is exposed to the atmosphere, it continues to be sticky and the strip can be applied to a carton. However, an adhesive tape having a water-moistenable adhesive is active for only a limited "open-time." By "open-time" is meant the time period during which the adhesive remains in a moistened state and therefore in a condition to be applied to a carton or other article.

If the tape is a Kraft paper tape coated on one side with a re-moistenable adhesive, such as starch, when this adhesive is made wet with water, the water will be absorbed by the paper. As a consequence, the "open-time" of the tape will be relatively short. This is true also of a fiberglass-reinforced paper tape. With a typical paper-based sealing tape having a re-moistenable adhesive coating on the paper, the "open-time" is from about 10 to 30 seconds. More aggressive re-moistenable adhesives have shorter open-times.

The sealing tape disclosed in the above-identified Williams patents have a water-moistenable adhesive coated on the paper carrier laminated to the plastic film, and while the plastic film ply is impermeable to water, the paper carrier is not. Hence when the adhesive is moistened with water, the water is quickly absorbed by the paper carrier and the "open-time" of the Williams tape during which it remains in a moistened condition is quite short.

An adhesive tape which has a short "open-time" limits the ability of the user to apply the tape to a carton or other article to be sealed, for the tape must be applied before the expiration of the "open-time" period, otherwise it will not stick to the carton. Hence with tapes having a short open time, the tape dispenser must be brought close to the carton to be sealed. One cannot carry a strip of moistened tape to a carton some distance from the dispenser, for in the few seconds it takes to reach the carton, the tape will dry out and become useless.

Another drawback of tapes in which a re-moistenable adhesive coats a water-absorbent paper layer, such as in the Williams patents, is that when the paper absorbs the water, it then curls, as a consequence of which it becomes difficult to handle the tape which must be applied flat onto the carton to be sealed.

Also of prior art interest is the Lutzmann et al. U.S. Pat. No. 4,096,013 which discloses corona-discharge treatment of a plastic film to render its surface wettable.

SUMMARY OF INVENTION

The main object of this invention is to provide a water-re-moistenable sealing tape for sealing a carton or other article formed of recyclable material, the tape being constituted by a paper-plastic film laminate which, though thin, is of high strength, the tape being strippable from the article which can then be reused or recycled.

More particularly, an object of this invention is to provide a tape of the above type which has a controlled "open-time," the plastic film ply being coated with a remoistenable adhesive which when activated by water is not absorbed by the film ply and does not impart a curl to the tape.

By "controlled open-time" period is meant that the duration of this period in the course of which the adhesive remains in a moistened state depends entirely on the nature of the remoistenable adhesive, for when this adhesive is moistened by water, the water is not then absorbed by the plastic film on which the adhesive is coated but only by the adhesive. But regardless of the nature of the adhesive, the open-time period of a sealing tape in accordance with the invention can be longer than that of a tape in which the adhesive is coated on a paper carrier, for then the water is absorbed by the paper and the period in which the adhesive remains moist is relatively short.

More specifically, an object of the invention is to provide a tape of the above type in which a base ply of biaxially-oriented, synthetic plastic film whose opposing surfaces are treated to render them wettable and receptive to adhesives, is laminated by a water-based non-remoistenable adhesive to a face ply of paper, the exposed wettable surface of the film ply having a re-moistenable adhesive layer coated thereon so that the tape, when moistened by water, can be adhered to the article to be sealed.

A significant feature of the invention is that cold lamination is used to join the plastic film base ply to the paper face ply; hence no heat is applied to the oriented film of the base ply that would impair its orientation and weaken the film. And because the paper face ply of the laminate is permeable, it affords a printable surface which may be used to mark or decorate the sealing tape.

Another advantage of a sealing tape in accordance with the invention is that it may be produced by a two-step process, thereby gaining a significant reduction in manufactoring costs as compared to tapes that require a three-step process to produce.

Briefly stated, these objects are attained in a paper-film laminate sealing tape for sealing a corrugated board carton or other article fabricated of recyclable material. The tape is composed of a base ply formed of oriented synthetic plastic film whose opposing surfaces are corona-discharge treated to render them wettable and receptive to adhesives, and a paper face ply cold laminated to the base ply by a water-based adhesive. The exposed surface of the base plastic-film ply is coated with a water-remoistenable adhesive, so that when this adhesive is moistened in a tape dispenser, the sealing tape can then be adhered to the carton.

Since the re-moistenable adhesive is coated on the plastic film ply which is water-impermeable, and does not therefore absorb water, when this adhesive is moistened with water, it remains in a moistened state in a condition to be applied to the carton for a controlled "open-time" period. Because of the strong bond between the plastic film ply and the paper face ply which resists delamination, the tape laminate adhered to the carton may be stripped therefrom, so that the carton can then be recycled or reused.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a cross section taken through a sealing tape in accordance with the invention, the thickness of whose plies is grossly exaggerated;

FIG. 2 is a plan view of the tape whose paper face ply is cut away to expose the plastic film base ply;

FIG. 3 schematically shows a continuous system for manufacturing the tape;

FIG. 4 shows a carton sealed with the tape; and

FIG. 5 is a plan view of a modified tape in which fiberglass reinforcing strands are sandwiched between the plies.

DESCRIPTION OF INVENTION

The Laminate Sealing Tape

Referring now to FIGS. 1 and 2, a sealing tape T in accordance with the invention includes a face ply 10 formed of Kraft or other suitable paper sheeting. Face ply 10 is cold-laminated by an adhesive layer 11 to a base ply 12 of high-strength, synthetic-plastic oriented film. Preferably the film is formed of a biaxially-oriented material, such as polyethylene, polypropylene or polyester (MYLAR). The opposing film surfaces of base ply 12 are rendered wettable by corona-discharge treatment so that they are receptive to adhesives.

Coated on the exposed wettable surface of base ply 12 is a re-moistenable adhesive layer 13, so that the sealing tape can be adhered to a carton, a package or other article fabricated of recyclable material. The tape acts to close the flaps or joints of the carton, or to carry out any other conventional sealing function.

The plastic film base ply 12 is preferably no more than two mils in thickness; hence, by itself, it lacks rigidity and body. The Kraft paper face ply 10 is thicker, being preferably 2 or 3 mils thick, but no greater than 5 mils, thereby imparting a measure of stiffness and body to the tape.

When film ply 12 is biaxially-oriented, it has exceptional tensile strength. Such orientation is normally effected by stretching the film along both its transverse and horizontal axes to molecularly orient the structure of the film. The strength of the paper face ply alone is not high, but the paper-film laminate has both body and high strength, so that a roll of this tape can be used in a standard Kraft paper tape dispenser in which the gummed side of the tape is moistened as the tape is drawn out of the dispenser.

Cold lamination of the plies is effected by a water-based adhesive, such as a polyacrylic copolymer composition having an affinity both for the paper ply and the film ply. Because the water-based adhesive is fluid at ambient temperature and is not a hot melt adhesive, no heat is applied to the biaxially-oriented film as it is being laminated to the paper ply. By water-based adhesive is meant an adhesive which cannot thereafter be reactivated by water, as distinguished from a remoistenable adhesive which can. A preferred water-based adhesive for effecting cold lamination is a polyvinyl acetate copolymer.

It is important to bear in mind that a biaxially oriented film is heat-sensitive and that at elevated temperatures, the film relaxes and loses its molecular orientation and strength. It is known, for example, that when two sheets of biaxially-oriented polyester film are seamed together, using an ultrasonically-activated sealing bar for this purpose which creates internal friction and heat within the film and causes the superposed films to soften and fuse, the resultant sealing line is weak, and the sheets then tend to tear along this line.

Cold lamination is, therefore, essential to the present invention in order to produce a tape laminate of high strength.

The moistenable, water-soluble adhesive coating 13 on the exposed surface of plastic film base ply 10 is preferably a water-based starch or animal glue, or of any other composition, such as a water-based latex conventionally used in gumming tape.

It is to be noted that a synthetic plastic film material, such as polypropylene, is normally not receptive to adhesives, especially water-based adhesives. Hence if one were to apply to the surface of this film a water-based adhesive which is flowable at ambient temperature or at a temperature somewhat above ambient but not at the elevated temperature of a hot melt adhesive, the adhesive will not be adsorbed by the film.

Essential to the invention is that the opposing surfaces of the film forming the base ply of the tape be treated so as to render them wettable and hence receptive to adhesives. To this end, these surfaces are subjected to a corona discharge treatment which enhances their surface energy, as measured in dynes, and thereby renders these surfaces wettable to allow for better bonding of adhesives applied thereto.

The Kraft paper face ply 12, which is formed of cellulosic fibers, is permeable and therefore receptive to printing and writing. Because of this, one may print on the paper face ply such notices as FRAGILE or HANDLE WITH CARE, or one can write with a marker pen on the exposed surface of the tape. And in practice, a colored paper ply may be used to render the tape more attractive. Also one can apply to the tape stick-on labels or adhere a second sealing tape thereover to further reinforce the seal. This would not be possible with a sealing tape whose exposed surface is that of a synthetic plastic film.

The Manufacturing System

FIG. 3 schematically illustrates a continuous system for producing at high-speed a paper-plastic film laminate tape in accordance with the invention. The laminating stage of the system includes a combining station having a pair of cooperating pressure rolls 14 and 15 driven at high speed by a motor 16. The nip between these rolls is appropriate to the thickness of the webs to be laminated to provide the desired degree of laminating pressure to ensure secure bonding of the webs.

Fed concurrently into the nip of rolls 14 and 15 at the combining station are a web 17 of Kraft paper for forming paper face ply 10 of the tape and a web 18 of synthetic plastic film material to form base ply 12. Web 17 is drawn from a Kraft paper supply reel 19 supported at an elevated position. Paper web 17 is drawn downwardly from this reel and is guided by an idler roll 20 into a horizontal path leading into the nip of the combining rolls.

Film web 18 is drawn from a film supply reel 21 which is placed at a position to feed film web 18 directly into a horizontal path toward the nip of the combining rolls. Reel 21 is placed well in advance of the combining station in order to expose a fairly long stretch of film web before it enters the combining rolls.

Along this input stretch of the biaxially-oriented film web 18 formed of a synthetic plastic material, such as polypropylene having a high dielectric constant, is a first corona discharge electrode 22. Electrode 22 is spaced above the upper surface of the film to create an ionizable air gap therebetween. The film web 18 runs along a ground electrode 22G in vertical alignment with discharge electrode 22. A high-frequency voltage HV having an amplitude sufficient to produce a corona discharge is applied to electrode 22. The corona discharge, which is directed toward the upper surface of the film web, increases the surface energy at the web surface to render it wettable and, therefore, receptive to adhesives, but it does not affect the molecular orientation of the film.

Intermediate the first corona discharge station 22-22G and the combining station is an adhesive applicator 24 having a coating roll 25 which engages the now wettable upper surface of film web 18 and applies thereto the water-based adhesive, such as acrylic polymer or a water emulsion of a copolymer of polyvinyl acetate, for laminating the film web to the paper web to form the laminating adhesive layer 11 of the tape.

Thus concurrently entering the nip of pressure rolls 14 and 16 of the combining station at ambient temperature are paper web 17 and the adhesive-coated film web 18. These webs are subjected to pressure by pressure rolls 14 and 15, lamination being effected by this action.

The laminated webs 17-18 from the combining station in the laminating stage of the system in the output of a gumming stage are wound on an output reel 26 driven by a motor 27 whose operation is synchronized with motor 16 driving the pressure rolls, for these motors together serve to draw the webs from their supply reels.

Output reel 26 is so spaced from the combining station as to provide a fairly long output stretch sufficient to permit in the gumming stage, the corona-discharge treatment of the exposed surface of the film web 18 and the application to the then wettable surface of a water-remoistenable adhesive, after which the laminated webs 17 and 18 are fed through a dryer, and the dried paper web is subjected to steam treatment to restore its moisture content before the laminated webs are wound on output reel 26.

In the gumming stage, following the combining rolls of the laminating stage, is a second corona discharge station for subjecting the undersurface of film web 18 of the laminated webs to a corona discharge to render this surface wettable so that it is receptive to an adhesive to be later applied thereto. The second station consists of a corona discharge electrode 23 which is spaced from the undersurface of web 18 to create an air gap therebetween, and a cooperating ground electrode 23G engaging the upper surface of the web, a high-frequency voltage HV being applied to electrode 23. Following the second corona discharge station in the stretch leading to the output reel 26 is an applicator 28 whose coating roll 29 engages the now wettable undersurface of film web 18 to coat this surface with the re-moistenable adhesive forming the re-moistenable adhesive layer 13 on the plastic film underside of tape T.

Following the adhesive applicator 28 is a flotation dryer 30 to fully evaporate the water in the adhesives without however the adhesive constituents so that the laminated web 17-18 and the gumming thereon are in a fully dry state.

The laminating system can run at high speed, up to at least 1000 feet per minute. And while drying of the laminated webs in dryer 30 takes place at an elevated temperature as high as 400° F., the period during which the laminate passes through the dryer is very brief, and not sufficient to cause film ply 18 to relax and thereby impair the biaxial orientation of the film.

The rapid set of the laminate in which the film ply is laminated by a water-based adhesive to the paper ply allows for high speed operation without delamination. This cannot be accomplished had a hot melt adhesive been used, or had a solvent-containing adhesive been used in which the solvent must be driven off. The noxious fumes-emitted in the course of production represent a serious objection to the use of solvent-containing adhesives and a fire-hazard may also exist.

The paper side 17 of the laminated web, after leaving dryer 30, is exposed to steam from a source 31 which serves to restore its normal moisture content, for when the web passes through dryer 30, the natural moisture content of the paper ply is sharply reduced and the tape then has a tendency to curl when the gumming thereon is moistened in a tape dispenser.

If a strip of moistened tape is drawn from a roll tape dispenser and the strip then curls, it becomes difficult to handle, for this strip must be applied flat onto the carton to be sealed. The function of steam source 31 which adds moisture to the tape just before it winds on output reel is to render the tape non-curling.

Since a typical sealing tape has a width of two or three inches, and the webs from which these tapes are derived are much broader, the laminated paper-plastic film webs on output reel 26 are slit into tapes of the desired width by a conventional slitter having a bank of shear slitter blades.

While FIG. 3 shows a continuous high-speed system which combines a laminating stage with a gumming stage, in practice these stages may be separated so that the output of the laminating stage is a laminated paper-film web which is wound on a reel, and when it is desired to gum the laminated web, it is then fed into a separate gumming stage.

Applications

FIG. 4 shows a corrugated board carton having complementary flaps 32 and 33 which are sealed by a paper-film laminate tape T in accordance with the invention. To this end, the re-moistenable adhesive coating on the plastic film underside of the tape is moistened in a standard tape dispenser so that the tape bridging the edges of the flaps can be adhered thereto to seal the carton.

When tape T is so applied, its paper face ply 10 is exposed. The surface of this ply is printable; hence if the carton contains articles made of glass, a FRAGILE GLASS notice may be stamped onto the tape or pre-printed thereon.

Though the carton in the course of shipment be exposed to rain or snow, and this will wet the paper face ply, water cannot enter the carton, for the non-permeable plastic film base ply which seals the carton acts as a water barrier. And because the strength of the tape is largely determined by the strength of the film base ply, the tape will not be weakened by water even though its paper ply is wet.

But when the carton has served its purpose and is to be recycled, then before doing so, it is necessary to remove tape T, for its plastic film base ply is not acceptable to a paper recycling facility. To remove tape T, it is simply stripped, in toto, from the carton, as shown in FIG. 4, for the plastic film base ply 12 which is adhered to flaps 30 and 31 is far stronger than the corrugated paper board stock of the flaps. Hence when tape T is stripped off, the cellulose fibers on the surface of the flaps rupture to release the tape. Thus the tape is removed in toto from the carton which can now be recycled.

There are however two distinct situations which must be considered in regard to a carton from which the sealing tape T is stripped, for one must take into account whether the carton is then to be reused rather than recycled after a single use.

Situtation I

If the paper board carton shown in FIG. 4 from which tape T has been stripped is to be reused, it is necessary that in stripping off the tape, that this action not rip off paper fibers from the surface of the carton and thereby slightly mutilate the carton.

To satisfy this requirement, the strength of the bond between the film ply 12 of tape T and the layer 13 of water-remoistenable adhesive must be weakened. Hence when the tape is stripped from the carton, the adhesive layer 13 remains bonded to the carton and is separated from the film ply of the tape. Since layer 13 is a water-soluble adhesive, one can when reusing the carton, seal it with a moistened tape that overlies adhesive layer 13 bonded to the carton.

But the fact that the carton is reusable does not mean it cannot be recycled, for after the reused carton has served its purpose, it may be recycled in a paper recycling facility.

It is known to impart to a remoistenable adhesive a desired degree of bonding strength. Water-soluble natural adhesives for bonding papers are typically starches and dextrins whose chief sources are corn or potatoes. Dextrins for sealing envelopes are derived from starches by acid and heat treatment; The bonding strength of a starch can be raised or lowered by varying its salt and acid content.

Hence a suitable adhesive for Situation I. is a starch having a bonding strength which is stronger with respect to the paper of the paper board or corrugated paper board of the carton sealed by the tape than it is to the film ply of the tape on which the starch adhesive is coated. When therefore the tape is stripped off the carton, the water-based adhesive layer 13 remains on the carton. The water-based adhesive, though remaining on the carton, does not interfere with a paper recycling operation.

Situation II

In this situation, the nature of the tape must be such that when stripped off the carton, the adhesive layer 13 remains strongly bonded to the film ply 12 of the tape and therefore carries with it paper fibers torn from the surface of the carton. Hence in this situation, while the carton from which the paper-plastic laminate tape has been removed is now in condition for recycling, it may not be in acceptable condition for reuse.

In practice, whether the tape is tailored to Situation I or to Situation II depends on whether the tape is intended for a carton that is to be reused or to be recycled after a single use.

Modifications

The modified tape TM shown in FIG. 5 is essentially the same as tape T shown in FIG. 1, except that it is reinforced with fiberglass strands which do not, however, significantly increase the thickness of the tape.

To this end, sandwiched between paper face ply 10 and plastic film base ply 12 is a longitudinal array of parallel fiberglass strands 34. Each strand 34 is composed of a small cluster of glass fibers, each preferably having a denier of 0.1. In practice, two fibers are sufficient to form a cluster, although a greater number may be used to enhance the strength of the tape.

In making a reinforced tape of this type, a system essentially the same as that shown in FIG. 3 may be used, the strands of fiberglass being drawn from supply reels and being fed into the nip of the combining rolls between the dry paper web 17 and the adhesive coated web film 18, so that the strands, before entering the combining station, are wetted by the laminating water-based adhesive.

While there has been shown and described preferred embodiments of a paper-film laminate sealing tape in accordance with the invention, it will be appreciated that many changes and modifications may be made therein without, however, departing from the essential spirit thereof.

Thus, instead of a continuous system to produce the tape, a two-stage system may be used, in the first stage of which the paper and plastic film webs are joined together, but the outer surface of the plastic film web is not yet coated with a moistenable adhesive. In the second stage, the fully dried, laminated webs 17–18 are drawn through an adhesive applicator which applies the re-moistenable adhesive to the outer surface of the film web to form a wet coating which is then dried and steam treated before the web is wound on an output reel or fed into a web slitter station.

In producing a sealing tape in accordance with the invention, it is not essential that the opposing surfaces of the plastic film web be rendered wettable by subjecting these surfaces to a corona discharge in a laminating machine, as shown in FIG. 3, before the film web is combined with the paper web. In practice, the film web may be pre-treated to render its opposing surfaces wettable, in which case the film web supply roll carries an already wettable film web, thereby dispensing with the need for including corona discharge stations in the laminating machine. However, even when the film web is so pre-treated, it may still be desirable to include corona discharge stations in the laminating and gumming system in order to assure proper wettability of the opposing surfaces of the film web before adhesives are applied thereto.

Advantages

Corona-discharge treatment of the surface of a synthetic plastic material to render it wettable is known. While the effect of such treatment is to increase the surface tension or energy, this effect is not permanent. Hence should a film web have its surfaces treated and the web is then stored for a few days or a longer period before being laminated to a paper or other web, then the corona discharge treated surfaces may be of reduced effectiveness and a strong lamination will not be attained. In the present invention, corona-discharge treatment of a surface of the synthetic plastic film web takes place just prior to lamination to the paper face ply so that the plastic surfaces are then highly receptive to the water-based adhesive, and corona-discharge treatment of the other surface of the film web takes place just before a remoistenable adhesive is applied thereto.

In the Williams U.S. Pat. No. 4,351,877 which discloses a sealing tape for cartons and makes use of high-strength plastic film for this purpose, it is noted that while this tape is stronger than a conventional paper tape, "an inherent problem with using plastic is that it cannot hold a water-soluble adhesive." By a water-soluble adhesive is meant a remoistenable adhesive, such as is found on the flap of mailing envelopes. It is for this reason that in the Williams patent the plastic film layer is bonded to a paper carrier layer serving "only as a medium to 'carry' the water-soluble adhesive that could not otherwise be applied onto the plastic layer."

Hence when the Williams '877 tape is used to seal flaps of a cardboard carton, and later stripped off so that the carton can be opened, the paper carrier layer "remains on the carton and is so weak that it may be easily broken to permit opening of the carton." In a laminated tape in accordance with the invention having a controlled "open-time" characteristic in which the plastic film ply is directly coated with a layer of a moistenable adhesive, when the tape is stripped off the carton, it is stripped in toto so that nothing remains on the carton, except in the case where the bond between a water-soluble adhesive layer and the film ply is weak and the layer remains on the carton when the tape is stripped therefrom.

Similarly, in Williams U.S. Pat. No. 4,577,971, the laminated sealing tape disclosed in this patent has its film layer laminated to a paper carrier layer that is coated with a remoistenable adhesive, which is used to secure the tape to a carton.

As pointed out previously, because in the Williams patents, it is the paper carrier layer that is coated with a water-remoistenable adhesive, and the water is absorbed by the paper, the Williams sealing tapes have a short "open-time," and tend to curl, whereas a tape in accordance with the invention, the tape has a controlled "open-time" characteristic and is non-curling, for the remoistenable adhesive is coated on the water-impermeable plastic film ply of the tape and wetting of the plastic ply does not cause the tape to curl.

In a laminated sealing tape in accordance with the invention, the plastic film base ply is cold laminated to a paper face ply by a water-based adhesive, the other surface of the film ply being directly coated with a re-moistenable adhesive. Once the water-based laminating adhesive is set, it is then water-impermeable and cannot be reactivated with water. The other surface of the film ply which is coated with a re-moistenable adhesive may use a modified starch adhesive or other known gumming material for this purpose, the tape so coated having an "open-time" of controlled duration, for water is not absorbed by the film ply. It must be understood that the duration of the open-time period depends on the nature of the remoistenable adhesive. Thus a water-remoistenable adhesive, such as a starch having a clay component which absorbs water will have a less prolonged open-time, than another starch, even though both starch adhesives are coated on a film ply that does not absorb water.

A paper-film laminate tape in accordance with the invention in which an outer paper ply is joined by an adhesive layer to a film-ply coated with a remoistenable adhesive is far less expensive and less complicated to produce than a tape of the type disclosed in the above-identified Williams patent in which an outer paper ply is joined by an adhesive layer to a film ply which is joined by an adhesive layer to a paper carrier coated with a remoistenable adhesive.

While there has been shown preferred embodiments of a sealing tape in accordance with the invention, it is to be understood that many changes may be made therein without departing from the spirit of the invention.

What we claim is:

1. A method of making sealing tape comprising the steps of:
    dispensing a roll of water-impermeable plastic film having opposite first and second surfaces;
    applying adhesive to the first surface of the plastic film;
    adhering a paper layer to the first surface of the plastic film to produce a laminate;
    corona discharge treating the second surface of the plastic film to render it wettable and receptive to adhesives; and
    applying a water-remoistenable starch-based adhesive to the corona-discharge treated second surface of the plastic film while it remains wettable and receptive to the adhesive.

2. The method of claim 1 further comprising the steps of:
    drying the laminate and subsequently adding moisture to the paper layer.

3. The method of claim 2 wherein the step of adding moisture to the paper layer includes subjecting the paper layer to steam.

4. The method of claim 1 wherein adhesive applied to the first surface of the plastic film is a water based adhesive and wherein the paper layer and plastic film are cold laminated together.

5. The method of claim 4 wherein the plastic film is an oriented film.

6. The method of claim 4 wherein the water based adhesive is a polyacrylic copolymer composition.

7. The method of claim 4 wherein the water based adhesive is a polyvinyl acetate copolymer.

8. The method of claim 1 further comprising the step of corona discharge treating the first surface of the plastic film before applying the adhesive.

9. A method of making sealing tape comprising the steps of:

dispensing a roll of oriented water-impermeable plastic film having opposite first and second surfaces;

corona discharge treating the first surface of the of the plastic film;

applying a water based adhesive to the first surface of the plastic film;

dispensing a roll of paper having opposite first and second surfaces;

cold laminating the first surface of the paper to the first surface of the plastic film while dispensing the paper and plastic film;

corona discharge treating the second surface of the plastic film to render it wettable and receptive to adhesives; and applying a water-remoistenable starch-based adhesive to the second surface of the plastic film while it remains wettable and receptive to the adhesive.

10. The method of claim 9 wherein the water based adhesive is a polyacrylic copolymer composition.

11. The method of claim 9 wherein the water based adhesive is a polyvinyl acetate copolymer.

12. The method of claim 9 further comprising the steps of drying the laminate and subsequently adding moisture to the paper layer.

13. The method of claim 12 wherein the step of adding moisture to the paper layer includes applying steam to the second surface of the paper.

\* \* \* \* \*